United States Patent

Angelucci

[15] 3,674,864

[45] July 4, 1972

[54] PROCESS FOR STABILIZING PREPARATIONS OF INTERFERING VIRUSES

[72] Inventor: Romano Angelucci, Milan, Italy

[73] Assignee: Carlo Erba S.p.A., Milan, Italy

[22] Filed: July 8, 1970

[21] Appl. No.: 53,325

Related U.S. Application Data

[63] Continuation-in-part of Ser. No. 687,135, Dec. 1, 1967, abandoned.

[30] Foreign Application Priority Data

Dec. 16, 1966 Italy..................................31189 A/66

[52] U.S. Cl.......................................424/90, 424/89, 195/1.5
[51] Int. Cl............................................C12k 1/08, C12k 1/00
[58] Field of Search..........................424/89, 90; 195/1.5, 1.7

[56] References Cited

UNITED STATES PATENTS

| | | | |
|---|---|---|---|
| 2,908,614 | 10/1959 | Muggleton et al. | ...............424/89 X |
| 3,186,908 | 6/1965 | Rightsel et al. | ............................424/89 |
| 3,259,547 | 7/1966 | Cole | ...................................424/90 X |
| 3,485,718 | 12/1969 | Baker | ......................................195/1.5 |

OTHER PUBLICATIONS

Mizu Tani Nature 198 (4875): 109– 110 April 6, 1963 " A Simple Method for Purification of Influenza Virus."
Reimer Science 152: 1379– 1381 June 3, 1966 " Influenza Virus Purification With the Zonal Ultracentrifuge."

Primary Examiner—Shep K. Rose
Attorney—Cushman, Darby & Cushman

[57] ABSTRACT

A stabilized fluid preparation of interfering viruses containing a minor proportion of a mono- and/or disaccharide and a method of stabilization of interfering virus materials comprising mixing with the virus materials a minor proportion of a mono- and/or disaccharide and freeze-drying the resulting mixture.

8 Claims, No Drawings

PROCESS FOR STABILIZING PREPARATIONS OF INTERFERING VIRUSES

CROSS-REFERENCE TO RELATED APPLICATION

This application is a continuation-in-part of my copending application Ser. No. 687,135, filed Dec. 1, 1967 and now abandoned.

Interfering virus is a virus that has been modified so that if put in contact with susceptible cells, the interfering virus will enter the cell, will not multiply, but will prevent the multiplication of a virulent virus in that cell.

Interfering power is the power of such virus of preventing the multiplication, in a suitable medium, of any other virus also quite different from the first one.

The present invention is, in general, directed to a process for the stabilization of the surface structures and interfering power of preparations of inactivated viruses, in particular influenza viruses, employable in the prophylaxis of viral diseases. Preparation of the inactivated viruses by treating viral suspensions with ultraviolet rays or heat is well documented in the prior art, e.g., to the method of W. Henle and K. Pauker (Virology 1958, 6, 181), U.S. Pat. No. 3,259,547, Australian Pat. No. 282,210. The irradiated or heat-treated viruses prepared according to the prior art method mentioned above are suspended in buffer saline solutions of NaCl 0.9 percent by weight. The saline suspended viruses are destroyed or damaged by subsequent freezing or lyophilization. For example, in tests carried out with suspensions of influenza viruses APR 8; B Lee; FM 1, purified by adsorption and elusion from barium sulphate followed by differential centrifugation, a significant reduction in hemagglutinating titer after freezing and lyophilization was observed when the suspending medium was a saline solution (NaCl, 0.9 percent) as shown in Table 1.

TABLE 1

I — Variations of the hemagglutinating titer of influenza virus APR 8, purified, irradiated, suspended in saline solutions and kept at −25°C.

| | |
|---|---|
| Initial Hemagglutinating Titer (HA 50%) | 1/10240 |
| Hemagglutinating Titer (HA 50%) After 10 Days | 1/1280 |
| Hemagglutinating Titer (HA 50%) After 15 Days | 1/640 |

II — Variations of the hemagglutinating titer of influenza virus APR 8, purified, irradiated and suspended in saline solution

| | |
|---|---|
| Initial hemagglutinating titer (HA 50%) | 1/10240 |
| Hemagglutinating titer after lyophilization (HA titer 50%) | 1/1280 |

There have been several suggested methods of stabilizing virus material, e.g. antigenic material, in the prior art. In U.S. Pat. No. 2,908,614, there is disclosed the step of uniformly incorporating the sensitive biological product in an aqueous dextran solution wherein the dextran has a molecular range substantially within the range of from 10,000 to 50,000. This reference also discloses that low molecular weight sugars such as glucose and lactose have the "technical disadvantage that they are singularly retentive of water thus making the freeze-drying procedure more hazardous to sensitive materials." The patentees found that by using dextran alone it was particularly easy to overdry the sensitive materials and thus kill or damage the organisms. It was found convenient to control the amount of residual moisture by incorporating, in the dextran medium, some inert substance which strongly retains water, e.g. glucose, which, in suitable concentration, enabled the optimum amount of moisture to be retained (See U.S. Pat. No. 2,908,614, column 3, lines 40–68). The patentees also reported that the stabilization of the vaccine could be obtained without the addition of the glucose by analytical control of the drying step (see column 3, lines 69–72).

In U.S. Pat. No. 3,186,908, it was reported that when calcium lactobionate is added in minor proportion to virus antigen solutions improved stability of the virus was obtained. The patentees also suggest the use of lactose in addition to the calcium lactobionate. The lactose facilitates the drying of the antigen solution in a manner similar to the glucose additive of U.S. Pat. No. 2,908,614.

It has now been found that an aqueous suspension of inactivated virus can be stabilized from the detrimental harm incurred during freezing and lyophilization of the virus by incorporating a minor proportion of a mono- and/or disaccharide into the aqueous suspension.

It is therefore an object of the invention to provide virus materials which have increased surface structures stability and increased interfering power especially during freeze-drying or when held in storage or in process for prolonged periods.

It is also an object to provide fluid virus materials which can be subjected to successive freezing and thawing without substantial loss of interfering potency.

A further object is to provide means for stabilizing virus materials.

These and other objects, features and advantages, which will be apparent from the following description of the invention, are realized by providing stabilized interfering viruses obtained by purification of a viral suspension of virus obtainable by various known methods using allantoic or amniotic liquids of embryonated eggs or liquids of diploid human cell cultured "in vitro" infected with various viruses. The purified viruses are then inactivated and suspended in an aqueous solution comprising a minor proportion of a mono- and/or disaccharide. The concentration of inactivated virus in the aqueous solution is not critical. The process of the present invention is applicable to both solutions containing small concentrations of virus and solutions containing large concentrations of virus.

Among the interfering viruses which have been found to be stabilized by the addition of a minor proportion of mono- and/or disaccharides to the aqueous suspension of viruses, there are influenza virus type A and type B, parainfluenza virus type 3, New Castle disease virus, Sindbis virus and Vescicular stomatitis virus.

The monosaccharides which supply a stabilizing effect on the interfering viruses are glucose, mannose, laevulose, galactose, sorbose, talose, tagatose, gulose, mannitol and the like. The disaccharides which are effective are gentiobiose, lactose, isomaltose, maltose, melibiose, nigerose, sucrose, sophorose, trehalose, xylobiose and the like.

The operative weight per cent ranges of the mono- and/or disaccharides can vary from about 0.5 percent to about 25 percent, with the exception that those which have a solubility in water of less than 25 percent (for example mannitol and lactose) can vary from about 0.5 percent up to their maximum solubility in the solution. The preferred weight per cent range is of about 0.5 percent for the monosaccharides and of about 1 percent for the disaccharides.

The invention is illustrated but not limited by the following examples. The concentration of ingredients is given in weight per volume percentage, unless otherwise specified. In the examples, the suspension of viruses were purified according to the method proposed by H. Mizutani, "A Simple Method For Purification of Influenza Virus," Nature 198, 4875, 109–110. The viral suspensions were first centrifuged at 6,500 rpm. for 10 minutes and then the supernatant mixed with a suspension of 12.5 percent BaSO$_4$ in bidistilled water. This mixture was allowed to stand overnight at 4° C. and then slowly centrifuged. The sediments were suspended into a 0.25 molar solution of sodium citrate having a pH of 8.0. This mixture was then allowed to stand for approximately 24 hours at 4° C. and centrifuged. The solution of sodium citrate containing the virus was recovered and dialyzed at 4° C. under continuous stirring against bidistilled water. The material so obtained, suitably diluted, was inactivated by irradiation with U.V. rays and then centrifuged at 43,500 rpm for 90 minutes. The sediment was suspended into solutions of various concentrations of mono- and/or disaccharides and these solutions were lyophilized.

EXAMPLE 1

Suspensions of influenza virus APR 8 purified as previously said, were prepared in solutions of the following mono- and disaccharides, then lyophilized. As controls equal suspensions were prepared in saline solution (NaCl 0.9 by weight) and in buffer saline solution of Dulbecco and Vogt. The results were as follows:

|  | Hemagglutinating titer before lyophilization | Hemagglutinating titer after lyophilization |
|---|---|---|
| Sucrose (1.0%) | 1/5120 | 1/5120 |
| Maltose (1.0%) | 1/5120 | 1/5120 |
| Lactose (1.0%) | 1/5120 | 1/5120 |
| Glucose (0.5%) | 1/5120 | 1/5/20 |
| NaCl (0.9%) | 1/5120 | 1/1280 |
| Saline solution of Dulbecco and Vogt | 1/5120 | 1/1280 |

EXAMPLE 2

Influenza virus APR 8, which had been purified and irradiated with U.V. rays, were divided into two groups, the first suspended in a buffer saline solution of Dulbecco and Vogt and the second suspended in a sucrose solution. These suspensions were lyophilized and redissolved by addition of a suitable volume of distilled water.

The stability of the two groups of inactivated virus solutions was determined by first, inoculating embryonated eggs with doses of the solutions, second, 16 hours after the first inoculation, inoculating the eggs with doses of active virus APR 8 and third, after periods of 24 and 48 hours after inocculation with active virus, determining the hemagglutinating titer for a sample taken from the eggs. A set of control eggs was inoculated with the active virus only.

The hemagglutinating titer for samples taken from eggs which had been inoculated by inactive virus suspended in 1 percent sucrose is shown in Table 2. The hemagglutinating titer for samples taken from eggs which had been inoculated by inactive virus suspended in the buffer saline solutions of Dulbecco and Vogt is shown in Table 3.

The hemagglutinating titer for the control eggs which were inoculated with active virus only is shown in Table 4.

TABLE 2

[Interference induced from APR 8 virus inactivated with U.V. rays and suspended in 1% sucrose]

| | | Hemagglutinating titers observed (HA titers 50%) | |
|---|---|---|---|
| Inactive APR 8 | Active APR 8 | 24 hrs. after active virus inoculation | 48 hrs. after active virus inoculation |
| Group: | | | |
| I...... 200 HA 50% | 1×10⁶ EID 50% | Negative | 1/20 |
| II..... 200 HA 50% | 1×10⁵ EID 50% | do | 1/20 |
| III.... 200 HA 50% | 1×10⁴ EID 50% | do | (¹) |

¹ Negative.

TABLE 3

[Interference induced with APR 8 virus, inactivated with U.V. rays and prepared in buffer saline solution of Dulbecco and Vogt]

| | | Hemagglutinating titers observed (HA titers 50%) | |
|---|---|---|---|
| Inactive APR 8 | Active APR 8 | 24 hrs. after active virus inoculation | 48 hrs. after active virus inoculation |
| Group: | | | |
| I    200 HA 50% | 1×10⁶ EID 50% | 1/160 | 1/320 |
| II   200 HA 50% | 1×10⁵ EID 50% | 1/80 | 1/640 |
| III  200 HA 50% | 1×10⁴ EID 50% | (¹) | 1/640 |

¹ Negative.

TABLE 4

[Controls inoculated only with active APR 8 virus]

| | Hemagglutinating titers observed (HA titers 50%) | |
|---|---|---|
| Active APR 8 | 24 hrs. after active virus inoculation | 48 hrs. after active virus inoculation |
| Group: | | |
| I......... 1×10⁶ EID 50% | 1/640 | 1/640 |
| II........ 1×10⁵ EID 50% | 1/320 | 1/1,280 |
| III....... 1×10⁴ EID 50% | 1/320 | 1/1,280 |

The above data clearly shows the decreased interfering power of the preparations of virus prepared in saline solutions in comparison with the preparations in the sucrose solutions. The stabilizing effect as to preparations of virus prepared in the sucrose solutions is dramatic.

What is claimed is:

1. A process for the stabilization against significant freeze-reduction of effective initial hemogglutination titers of inactivated virus materials which have been purified by adsorption and elution from barium sulfate and concentrated by differential centrifugation and which are prophylactic against virus diseases, by interfering with the multiplication of virulent virus in susceptible cells, which comprises suspending said virus materials in an aqueous solution consisting essentially of from 0.5 to 25 percent by weight of at least one saccharide selected from the group consisting of glucose, mannose, laevulose, galactose, sorbose, talose, tagatose, gulose, mannitol, gentiobiose, lactose, isomaltose, maltose, melibiose nigerose, sucrose, sophorose, trehalose, and xylobiose, and subsequently freezing or freeze-drying the suspended virus material without significant reduction in hemagglutination titer.

2. A process as in claim 1 wherein the aqueous solution of virus materials and saccharide is frozen.

3. A process as in claim 1 wherein the aqueous solutions of virus materials and saccharide is freeze-dried.

4. A process as in claim 3 wherein the virus materials is selected from the group consisting of influenza virus type A, influenza virus type B, parainfluenza virus type 3, New Castle disease virus, Sindbis virus and Vescicular stomatitis virus.

5. A stabilized frozen or freeze-dried inactivated virus material in accordance with claim 1 comprising said inactivated virus material suspended in an aqueous solution consisting essentially of glucose, mannose, laevulose, galactose, sorbose, talose, tagatose, gulose, mannitol, gentiobiose, lactose, isomaltose, maltose, melibiose, nigerose, sucrose, sophorose, trehalose and xylobiose.

6. A stabilized interfering virus material as claimed in claim 5 wherein the virus material is selected from the group consisting of influenza virus type A, influenza virus type B, parainfluenza virus type 3, New Castle disease virus, Sindbis virus and Vescicular stomatitis virus.

7. A stabilized interfering virus material produced by freeze-drying the product of claim 5.

8. A stabilized interfering virus material produced by freeze-drying the product of claim 6.

* * * * *